Patented Dec. 16, 1941

2,266,636

UNITED STATES PATENT OFFICE 2,266,636

INORGANIC FILM PRODUCTS AND METHOD OF MAKING SAME

Ernst A. Hauser, Cambridge, Mass., assignor to Research Corporation, New York, N. Y., a corporation of New York No Drawing. Application June 7, 1938, Serial No. 212,398

8 Claims. (Cl. 18—57)

This invention relates to flexible, coherent, self-supporting solid bodies such as films, filaments, coatings and the like formed of colloidal, crystalline inorganic hydrous oxides which contain structural water and are capable of swelling when brought into contact with water to form plastic hydro-gels and exhibit base exchange properties, and to the process of making such bodies.

It is known that certain organic materials are capable of forming coherent, self-supporting flexible films or sheets upon being deposited in a thin layer from a solution or suspension by evaporation of the solvent or vehicle. Typical examples are rubber, cellulose derivatives and resins. The formation of such films may be explained by the theory that the film-forming materials are composed of large, long-chain molecules which felt together when the diluting vehicle is removed.

Now I have found that a somewhat similar result may be obtained with certain inorganic materials such as highly hydrated colloidal clays, e. g., bentonite. It is of course known that a film or thin layer of finely divided inorganic materials may be deposited on solid surfaces. For example, a suspension of chalk in water may be deposited as a film on a solid surface and dried, resulting in a coating of the chalk on the solid surface. If a sufficiently thick deposit is produced it may be removed as a self-supporting rigid cake, but so far as I am aware no one heretofore has produced self-supporting coherent flexible films of inorganic materials without an organic binder.

The ability of inorganic materials to form self-supporting coherent flexible films apparently depends upon their ability to form gels due to the presence of strongly hydrated highly colloidal matter. I have found that when a sol (water dispersion) of such a colloidal strongly hydrated inorganic material, such as a water suspension of a highly hydrated collidal bentonite, is deposited as a thin coating on a solid surface and dried, the resulting film may be removed from the surface and is coherent, self-supporting and flexible and may have sufficient strength to permit its use for a variety of purposes.

Ultramicroscopic investigation has shown that during the evaporation of the vehicle of such an inorganic sol it passes through the gel stage, with the particles still in random arrangement (after Brownian motion has ceased) and finally, as the particles are forced closer and closer together by removal of the vehicle, they line up and produce relatively long filaments or fibers and fiber bundles which interweave and interfelt to form a coherent film. Under magnification some of the films have somewhat the appearance of a woven fabric. This formation of fibers probably is due to the fact that when colloidal particles of an isometric shape and possessing a sufficient polarity are brought sufficiently close together by removal of the suspending medium they attach to each other to form the fibers or fibrous crystals which have been observed. X-ray anaylsis of the film shows that whereas the X-ray diffraction diagram obtained by exposing the film normal to its surface shows only part of the lines characteristic of the X-ray diffraction powder diagram of the material, e. g., montmorillonite, of which the film is formed and whereas a picture obtained by exposing the film edgewise shows an X-ray diffraction fiber pattern which also lacks certain lines found in the powder diagram of the material, the two film diagrams when superposed or combined give a complete pattern which matches the powder pattern of the material. This observed characteristic of the films is believed to be capable of serving to identify films in accordance with the invention.

In order to form such films the particles of solid material which are capable of being hydrated and of swelling in water preferably are of colloidal dimensions. In general the smaller are the individual particles and the more nearly monodisperse the system the stronger and more flexible and less brittle will be the film produced although useful films may be made from materials with the particles in the upper range of colloidal dimensions and with somewhat polydisperse systems, containing, for example, particles ranging in size from 0.1 to 0.5 micron. By colloidal dimensions I mean particle sizes less than 1 micron. The particles within a given batch of material will of course vary in size but it is preferred that the bulk of the particles shall be of a particle size of the order of 0.01 to 0.1 micron.

A suitable method for the preparation of the films is as follows:

Bentonite (a hydrous aluminum or magnesium or aluminum magnesium silicate) of commercial grade which may have been partially purified to free it of coarse grained impurities in any suitable manner such as air sifting is suspended in water and allowed to settle for several days and the liquid is decanted from the deposited sludge. A suspension containing 1 to 2% of solids is suitable for this purpose. This sludge consists largely of particles of greater than colloidal size, and consists mainly of quartz, calcium carbonate, feldspar and the like. The decanted suspension which may be taken off in fractions at different levels is then subjected to the action of a supercentrifuge, for example a centrifuge having a cylindrical tube about 2 inches in diameter operated at about 25,000 revolutions per minute. The suspension is flowed in at the bottom and out at the top resulting in a deposition of heavier or coarser particles on the wall of the tube near the bottom and lighter and smaller particles nearer the top of the tube. The overflow contains still smaller particles and may be subjected to further centrifuging for the recovery thereof. The deposit on the wall of the tube may be separated into two or more fractions according to particle size or distance from the bottom of the tube, resuspended in water and centrifuged again. By this procedure one may obtain a substantially monodisperse sol of any desired average particle size. The particle size range within the fraction should be relatively small e. g., not more than about 10 millimicrons in a product having an average particle size of up to say 100 millimicrons. The larger the average particle size of particle the greater may be the actual difference in particle size but the relative difference in particle size, i. e., the ratio of the difference to the average particle size should be small e. g., not more than about one-fourth of the average particle size.

The suspension passed through the centrifuge should be quite dilute. In general the finer the average size of the particles in suspension the more dilute should be the suspension. A concentration of 0.5% to 1% is suitable for the crude suspension obtained by stationary settling of a suspension of bentonite containing particles of all sizes up to about 1 micron.

Films of the resulting refined material may be produced in a variety of ways. For instance the suspension may be deposited as a film or layer on a suitable removable liner within the centrifuge cylinder, the liner and film removed, laid flat and dried and the films stripped off of the liner. Foils of aluminum, copper, brass, etc., are suitable for the liner or one may use other materials with or without a coating such as paraffine to prevent adhesion of the film.

Similar films may be formed by flowing a dilute suspension or sol e. g., 1 or 2% on a suitable surface such as glass and allowing it to dry and stripping off the resulting film. Continuous films and filaments may be produced in the ways commonly employed with other film and filament forming materials. For example a drying cylinder may be revolved in contact with the suspension. It is also possible to employ the material in such a concentration that it is more or less gelatinous or pasty by spreading it in substantially uniform thickness on a suitable surface. It will be apparent that films of any desired thickness may be produced and that by selecting the average size of the particles in suspension, films of different grades as to strength, flexibility, degree of transparency etc. may be produced. Films made from suspensions of large particle size tend to lack flexibility or to be brittle. Certain impurities in the suspension tend to interfere with the formation of the fibrous structure and produce weak spots in the resulting films.

Films made from bentonite after being dried in the air at atmospheric temperatures contain a considerable amount of water e. g., 8% and are capable of swelling in water. This is particularly true of the natural clays which contain alkali metal. The clays in which the alkali metal has been replaced by hydrogen e. g., the hydrogen clays lose this property of swelling in water upon being air dried. After the non-hydrogen clay films have been heated to 110° C. or higher they are dehydrated and also lose proportionately this property of swelling in water. After slow dehydration the films may be heated to white heat without being destroyed. Such heating yields a product which is very similar in appearance and in dielectric properties to mica. A useful product of this character may be made by heating the film to about 300° C. and simultaneously subjecting it to heavy pressure say 1000 pounds per square inch. If several of the films, before being dehydrated are laid together and then subjected to heating and heavy pressure a product resembling mica is produced.

Before being dehydrated by heating, the films, as stated above, swell in water but they are resistant to oils, acid, alkalies and other strong electrolytes and may be heated to white heat without being destroyed. Depending upon the purity of the clay, the size of the particles and the thickness of the film it may vary from being substantially opaque through all degrees of translucency to substantial transparency.

The utility of the films has not been fully investigated but certain uses are evident, e. g., as a substitute for paper where resistance to the action of certain corrosive chemicals is required and as an insulating flexible sheet material in place of mica, synthetic resins, and impregnated paper or fabric. As stated above a plurality of sheets subjected to high pressure and temperature strongly resembles mica in appearance and dielectric properties. The films are non-flammable, may be written or printed upon and are capable of withstanding high temperatures. A useful product may be made by coating or impregnating a plurality of the films with a solution or melt of a heat hardenable synthetic resin, superposing the so treated films and heating and pressing them to form a laminated structure having high dielectric properties.

The film may be deposited on a surface such as that of a corrodible metal, e. g., iron to serve as a base or priming coat for anti-corrosion paint.

I have successfully used a sol of bentonite having an average particle size of about 14 millimicrons and produced excellent flexible, self-supporting translucent film having a thickness of about one-thousandth of an inch. I have given the particle size range as from 10 millimicrons to 1 micron but as stated I prefer the smaller particles. A more practical range of particle size is from 0.05 to 0.1 micron.

In the above described process I have referred only to the preparation of suspension or sols suitable for the production of film, by centrifuging. It is, however, possible to produce such a suspension by settling. Thus by settling a suspension of bentonite in water for a week or more and then drawing off only the top-most layer of liquid I may obtain directly a sol which is capable of producing a self-supporting film.

The suspensions used for the production of film vary considerably in concentration. I have found pure clay suspensions of a concentration as low as 1.5% to be capable of forming a gel. On the other hand I have produced gels capable of being spread to a film containing as high as 10% of solids.

It will be apparent that a great variety of specific procedures may be employed for refining the bentonite to the desired particle size and to the desired particle size range within a given suspension. It is also apparent that a variety of methods may be used for forming the suspension into films.

In the foregoing I have referred particularly to bentonite as a specific example of materials capable of forming films. Within the genus of swellable, readily hydratable colloidal anisometric (polar) inorganic materials are other materials such as halloycite, gibbsite and vanadium pentoxide. Lime and silica gel may be expected to produce films. The absorption of water by the particles apparently is not analogous to the absorption of water by a sponge nor is it a chemical combination. Rather it appears to be an adsorption of water into a molecular structure. Montmorillonite, the basic constituent of bentonite has been found to give excellent results. By the term "self-supporting" in the description of the coherent, self-supporting, flexible solid body, I means bodies which in the absence of any physical support and in sizes of say up to 1 foot, maximum dimension, are capable of being handled, e. g. picked up between thumb and finger without tearing or breaking.

I claim:

1. A coherent, self-supporting, flexible solid body, the continuous structure at least of which consists of a colloidal crystalline, inorganic hydrous oxide which contains structural water, is capable of swelling when brought into contact with water to form a plastic hydro-gel and exhibits base exchange properties.

2. A body as defined in claim 1 in which the hydrous oxide is a colloidal clay.

3. A body as defined in claim 1 in which the hydrous oxide is montmorillonite.

4. A body as defined in claim 1 in which the hydrous oxide is a silicate of the group consisting of aluminum silicate, magnesium silicate and aluminum magnesium silicate.

5. A body as defined in claim 1 in the form of a film.

6. A cohorent, self-supporting, flexible solid body as defined in claim 1 in the form of a film characterized by a partial Debye Scherrer powder X-ray diagram of the mineral comprising the film when the film is radiated normal to a surface thereof, and a partial fiber diagram corresponding to the mineral component of the film when the film is radiated parallel to said surface, both diagrams combined and the fiber diagram rotated corresponding to a complete Debye Scherrer powder pattern of said mineral.

7. As a new product a plurality of superposed, adherent self-supporting flexible coherent films consisting essentially of a colloidal, crystalline inorganic hydrous oxide which contains structural water, is capable of swelling when brought into contact with water to form a plastic hydro-gel and exhibits base exchange properties.

8. Method which comprises forming a structurally compact film, filament, coating or the like of an aqueous suspension of a colloidal, crystalline, inorganic hydrous oxide which contains structural water, is capable of swelling when brought into contact with water to form a plastic hydro-gel and exhibits base exchange properties, and drying the same by exposing at least half of the surface area thereof to a drying atmosphere, said film, filament or coating being coherent, flexible and self-supporting.

ERNST A. HAUSER.